US008832826B2

(12) United States Patent
Kamasuka (10) Patent No.: US 8,832,826 B2
(45) Date of Patent: Sep. 9, 2014

(54) IMAGE FORMING APPARATUS, METHOD FOR CONTROLLING IMAGE FORMING APPARATUS, AND PROGRAM

(75) Inventor: Atsushi Kamasuka, New Hyde Park, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/891,652

(22) Filed: Sep. 27, 2010

(65) Prior Publication Data

US 2011/0078789 A1 Mar. 31, 2011

(30) Foreign Application Priority Data

Sep. 30, 2009 (JP) .................................. 2009-228315

(51) Int. Cl.
*G06F 21/00* (2013.01)
*G06F 21/60* (2013.01)
(52) U.S. Cl.
CPC ..................................... *G06F 21/608* (2013.01)
USPC .................................. 726/20; 726/2; 358/1.15
(58) Field of Classification Search
CPC ..................................................... G06F 21/608
USPC ......................................... 726/4, 20; 358/1.14
See application file for complete search history.

(56) References Cited

U.S. PATENT DOCUMENTS

| 6,607,139 B1* | 8/2003 | Jui-Chang et al. | 235/492 |
| 8,561,160 B2* | 10/2013 | Kino | 726/7 |
| 2003/0101254 A1* | 5/2003 | Sato | 709/223 |
| 2006/0290967 A1* | 12/2006 | Sumitomo et al. | 358/1.14 |
| 2009/0262381 A1* | 10/2009 | Tsujimoto | 358/1.14 |

FOREIGN PATENT DOCUMENTS

| JP | 2006-092437 A | 4/2006 |
| JP | 2007-251279 A | 9/2007 |
| JP | 2009-194441 A | 8/2009 |

OTHER PUBLICATIONS

"User centric identity management" Josang et al; AusCERT Asia Pacific Information Technology Security 2005, 13 pages.*
U.S. Appl. No. 12/875,397, filed Sep. 13, 2010, "Image Forming Apparatus, Control Method for the Same, and Storage Medium".

* cited by examiner

*Primary Examiner* — Jason Lee
(74) *Attorney, Agent, or Firm* — Canon USA, Inc. IP Division

(57) ABSTRACT

The purpose of the present invention is to add a user restriction function with use of a card by a simple structure even with an inexpensive image forming apparatus. A CPU of an image forming apparatus determines a port of a signal acquired from a card R/W at the time of initialization of the connected IC card R/W. Then, the CPU of the image forming apparatus controls an execution or a stop of an application for performing authentication service processing corresponding to the port of the signal received from the card R/W.

15 Claims, 9 Drawing Sheets

IMAGE FORMING APPARATUS, METHOD FOR CONTROLLING IMAGE FORMING APPARATUS, AND PROGRAM

BACKGROUND OF THE INVENTION

1. Field of the Invention

The present invention relates to an image forming apparatus capable of executing a plurality of applications to perform service processing.

2. Description of the Related Art

There is a system in which an integrated circuit (IC) card unit provided with the short-range wireless communication function can be connected to an image forming apparatus such as a copying machine. The authentication function/service has been commercialized to be used with such an image forming apparatus for enabling an image forming apparatus to identify a user and the department of the user and determine whether or not the user is allowed to use the image forming apparatus when the user holds an IC card storing user identification information over an IC card unit before operating the image forming apparatus.

With the increase in the number of copying machines designed as an open platform, the above-described function/service has been widely developed and commercialized by not only copying machine manufactures but also third-party software vendors (refer to "Japanese Patent Application Laid-Open No. 2007-251279").

Generally, for use in the authorization function with use of an IC card as mentioned above, the required specification varies depending on a market and a customer's environment. Especially in consideration of the improvement of the customer satisfaction, it is desirable to offer the service by realizing the specification and device configuration (an IC card unit and an authentication server) according to customer's requests.

On the other hand, there has been proposed an expensive image forming apparatus supporting an application based on the application programming interface (API) specification for an open platform. Such an image forming apparatus can be flexibly and conveniently arranged according to implementation of an application.

However, in a low-price image forming apparatus that is not designed as an open platform, a controller of the apparatus has to appropriately perform a control according to a device to be connected thereto and a service to be provided thereby. As a result, a problem arises in that it is difficult to develop, for example, a system employing a system with use of an IC card as mentioned above.

SUMMARY OF THE INVENTION

According to an aspect of the present invention, an apparatus to which a card unit configured to communicate with a card storing user information is connectable includes a storage unit configured to store an application for executing an authentication service, a determination unit configured to determine a port from information acquired from the card unit, and a control unit configured to control an execution or a stop of the authentication service according to the determined port.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
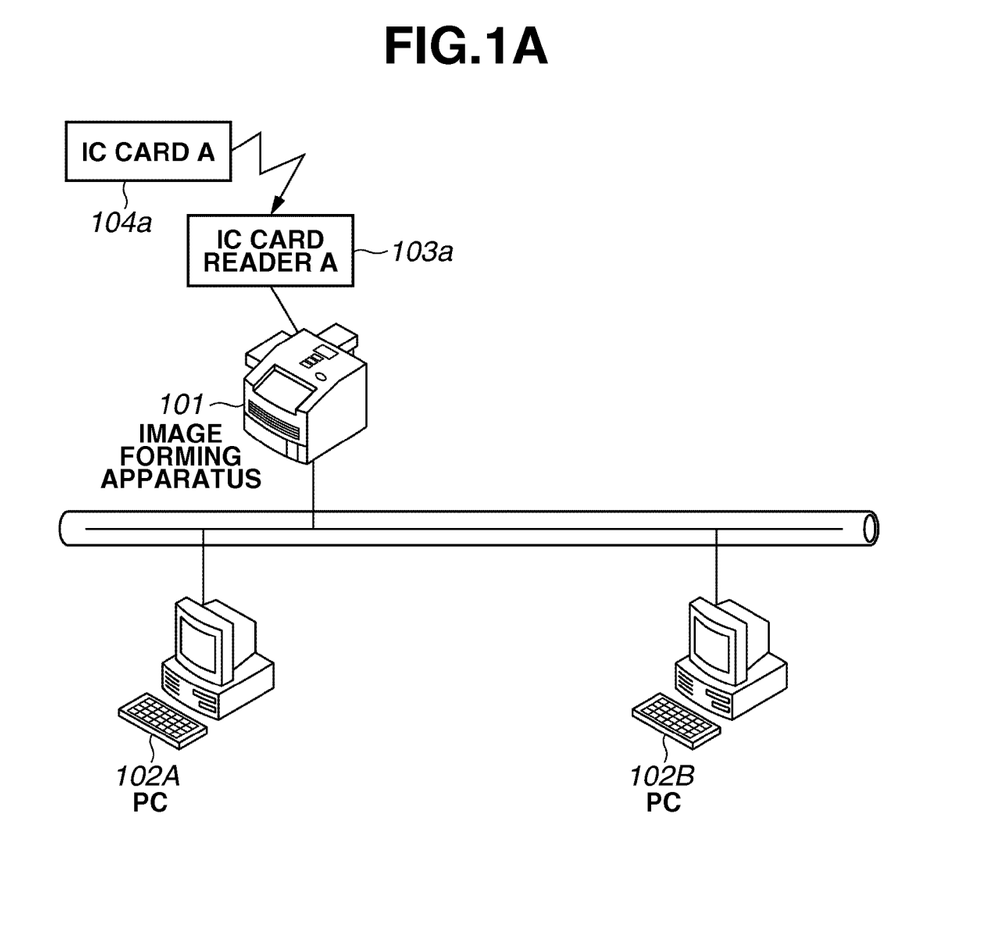
FIGS. 1A and 1B each illustrate a configuration of a system including an image forming apparatus.
Figure 1B:
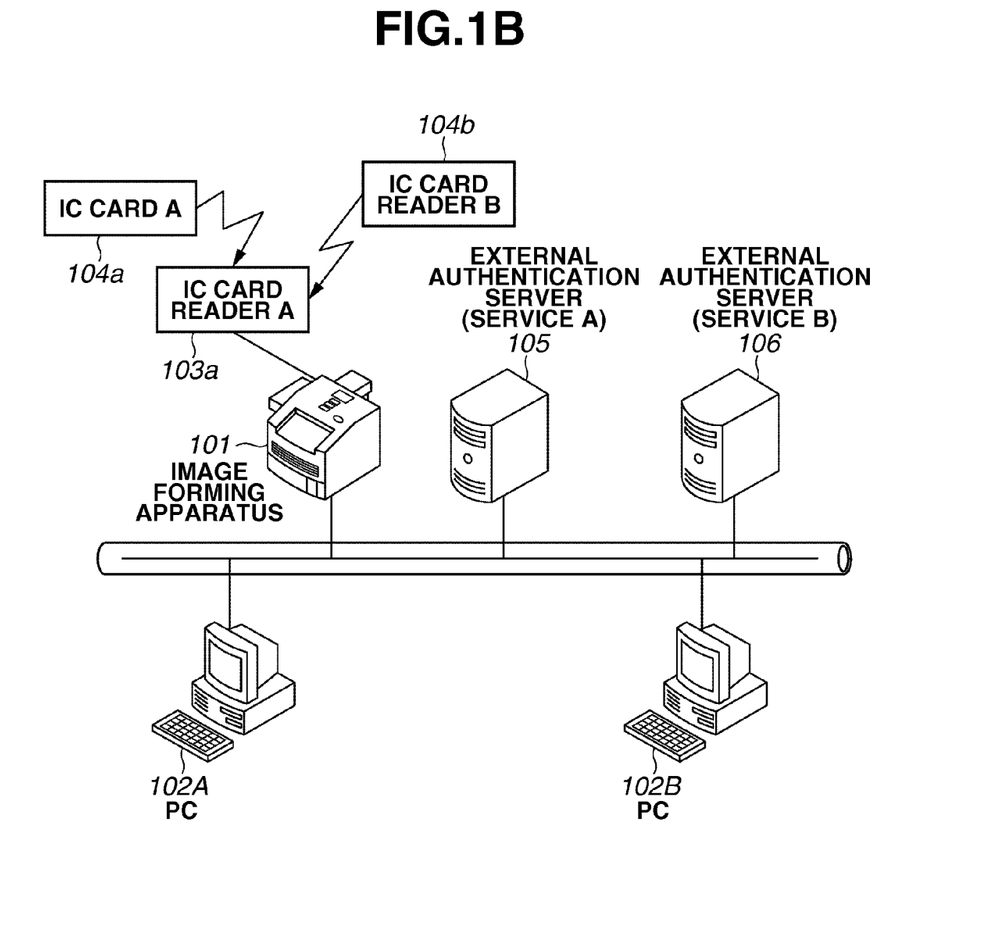

FIGS. 1A and 1B each illustrate a configuration of a system including an image forming apparatus according to a first exemplary embodiment of the present invention. This exemplary system includes an image forming apparatus 101, a plurality of information processing apparatuses 102A and 102B, and an external authorization server 105, which are communicably connected through a network.

The image forming apparatus employing the present invention is an example of a system for offering a user restriction processing service with use of an IC card as a card. Therefore, an IC card reader/writer (R/W) 103 communicable with an IC card 104 is connected to the image forming apparatus 101.

Here, the IC card 104 is constituted by a non-contact type IC card. The IC card R/W 103 transmits a carrier to the IC card 104, whereby power is supplied to the IC card 104 due to electromagnetic induction, and the IC card 104 and the reader 103 communicate with each other through carrier modulation.

On the other hand, the image forming apparatus 101 is provided with the function of determining through which port communication has been performed from among a plurality of ports each associated with an IC card reader, and performs user restriction function processing, which will be described later, according to the port information of the determined port.

Further, the image forming apparatus 101 has an authentication table, and is configured to perform authentication processing within the apparatus. In the present exemplary embodiment, the IC card R/W is referred to as "IC card unit", and the image forming apparatus 101 includes a universal serial bus (USB) host as an interface means for enabling a connection to the IC card unit.

FIG. 1A illustrates an example of a system which does not include an authentication server externally connected thereto. As such, the image forming apparatus 101 includes a plurality of ports each associated with the IC card R/W 103 exchanging signals with an IC card, and determines through which port communication has been performed to control a continuation of polling and an end of polling by taking steps illustrated in the flowchart as will be described later.

On the other hand, FIG. 1B illustrates an example of a system including external authentication servers 105 and 106 connected to the network. In this example, the external authentication server 105 provides an authentication service A by communicating with the image forming apparatus 101 through a port A, when an IC card 104a is held over an IC card R/W 103a of the image forming apparatus 101.

Information processing apparatuses (personal computer (PC)) 102A and 102B are connected in the network, and a printer driver is installed therein for transmitting a print job to the image forming apparatus 101. Further, the printer driver in the information processing apparatuses (PC) 102A and 102B can recognize the status of the image forming apparatus 101 by communicating with the image forming apparatus 101.

Referring to FIG. 1A, a user is given in advance an IC card 104 storing user authentication information for himself/herself from a system administrator, and holds the IC card 104 over the IC card R/W 103 when the user starts to operate the image forming apparatus 101. This action causes the image forming apparatus 101 to perform authentication processing, and allow the user to use the image forming apparatus 101 upon a success in the authentication.

Further, the present system may be modified to be capable of using a common IC card R/W 103c and a common IC card 104c to both the authentication service A and the authentication service B. Generally, two types of cards, contact type card and non-contact type card, are available as an IC card, and the IC card 104 may be embodied by either card.

Figure 2:
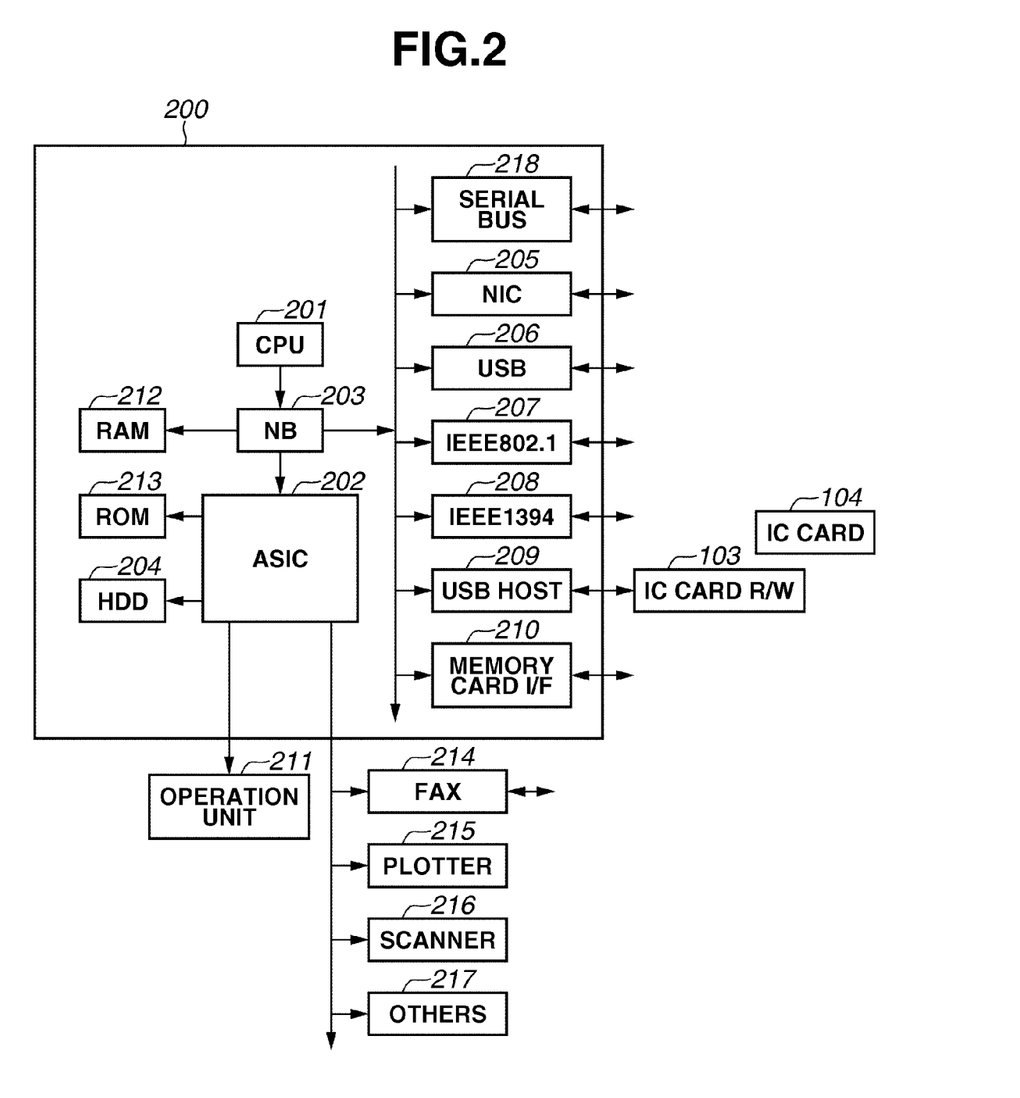
FIG. 2 is a block diagram illustrating a hardware configuration of the image forming apparatus.

FIG. 2 is a block diagram illustrating a hardware configuration of the image forming apparatus 101 illustrated in FIG. 1. The image forming apparatus 101 in the present example includes a controller 200 in charge of an overall control of the image forming apparatus 101, an operation unit 211 provided with an operation panel through which processing of the image forming apparatus 101 is instructed and operation settings of the image forming apparatus 101 are performed, and a facsimile control unit 214 in charge of a facsimile control.

Further, the image forming apparatus 101 includes a plotter 215 for an image formation, a scanner 216 for scanning of a document, and other hardware resources 217.

Here, the plotter 215 is so-called a printer engine, and performs image forming processing according to the electrophotographic method or the inkjet printing method. In the following description, the term "IC card 104" is used to collectively refer to IC cards, while the terms "IC card 104a" and "IC card 104b" are used to respectively refer to IC cards. Identifiable device IDs are stored in advance in the IC cards 104a and 104b, respectively. Further, in FIG. 2, the IC card R/W is indicated as "IC Card R/W 103".

Referring to FIG. 2, the controller 200 includes a central processing unit (CPU) 201 which performs an overall control of the image forming apparatus 101, and an application specific integrated circuit (ASIC) 202 for the controller 200 which includes an operation unit interface (I/F), a CPU I/F, a peripheral component interconnect (PCI) I/F, a memory controller, and others.

Further, the controller 200 includes a hard disk drive (HDD) 204 storing image data, a serial bus 218, and a network interface card (hereinafter referred to as "NIC") 205 equipped with the function for a connection to the network. An application associated with authentication service processing executed by the image forming apparatus 101 is installed in the HDD 204.

The HDD 204 is configured to be able to store a plurality of applications associated with authentication service processing, although the present exemplary embodiment can be applied if an HDD stores at least one application.

In the present exemplary embodiment, the image forming apparatus 101 is configured to be able to identify a port by reading an initialization result signal corresponding to a unique device ID assigned to an IC card R/W. The HDD 204 stores a correspondence table in which device IDs are associated with respective ports. The correspondence table is referred to according to a device ID acquired by the ASIC 202 from an IC card R/W, whereby the port is identified.

Further, the controller 200 includes a USB 206 for a connection to a device such as a keyboard, a mouse, and a printer, an IEEE 207 for a wireless local area network (LAN), and an IEEE 208 for a connection of a computer to a peripheral device.

Further, the controller 200 includes a north bridge (NB) 203 connected to a USB host 209 for a connection to the IC card R/W 103 through a USB cable, and a memory card I/F 210 through the PCI bus 218.

The USB host 209 is configured to be able to acquire a device ID from an IC card R/W connected through the USB cable. A device ID is information for identifying a connected IC card R/W, and is stored in a non-volatile memory of an IC card R/W in advance as unique information.

Such a device ID is read out when an IC card R/W is initialized, and is notified to the CPU 201 of the image forming apparatus 101. Further, the USB host 209 is configured to be able to be connected to IC card R/Ws having different device IDs.

The controller 200 further includes a random access memory (RAM) 212, a read-only memory (ROM) 213, and others. The ASIC 202 is connected to the facsimile control unit 214, the plotter 215, the scanner 216, and the other hardware resources 217 through the PCI bus 218. Here, "ASIC" is an abbreviation for Application Specific Integrated Circuit.

The CPU 201 is connected to the IC card R/W 103 by a USB cable via the NB 203, the PCI bus 218, and the USB host 209, and performs control by transmitting a command to the IC card R/W 103. An access to the IC card 104 is realized by wireless communication of the IC card R/W 103 with the IC card 104.

In the present exemplary embodiment, an IC card R/W is connected through the USB host 209, but may be connected through another interface other than a USB. The IC card R/W 103 stores a device ID in the internal memory thereof, and is configured so that it is possible to perform the processing of identifying a port through identification of the device ID.

Figure 3:
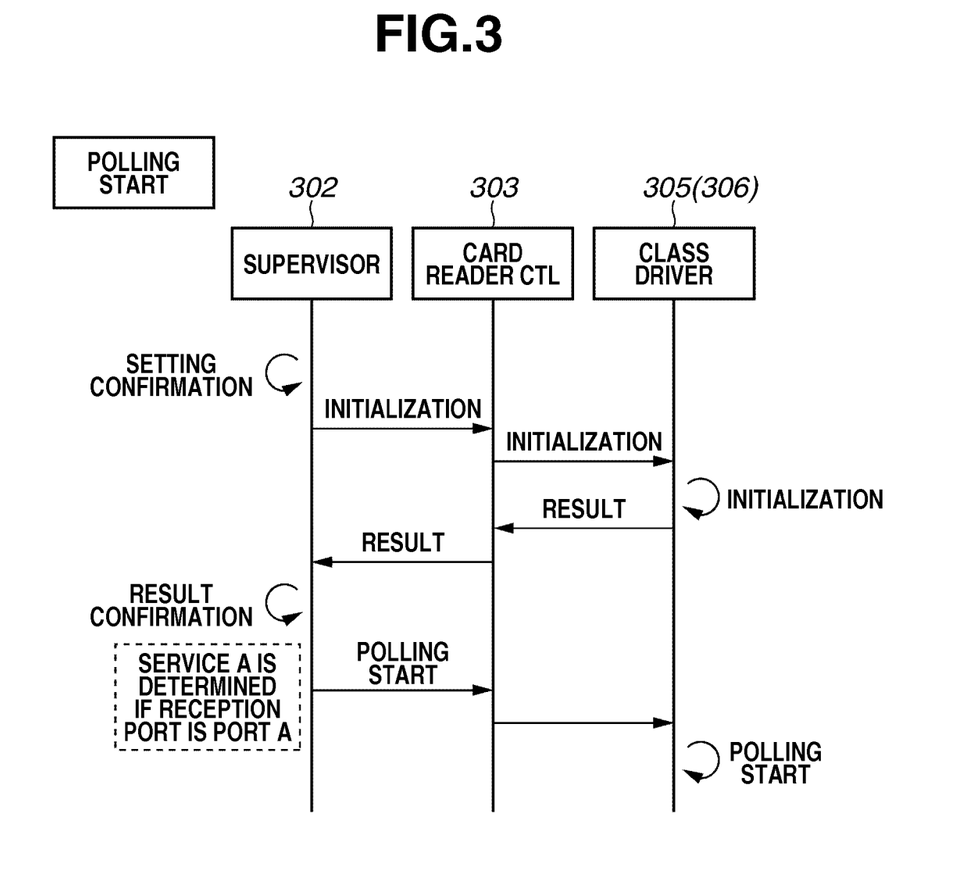
FIG. 3 is a sequence chart illustrating processing of software modules of the image forming apparatus.

FIG. 3 illustrates software modules and the exchanges among the respective modules in the image forming apparatus 101 according to the present exemplary embodiment. In this example, the image forming apparatus 101 locally authenticates a user. The respective software modules are executed by the CPU 201 illustrated in FIG. 2, whereby authentication processing for a user restriction is performed.

Referring to FIG. 3, a supervisor 302 issues an initialization request to a card reader controller 303 before starting the polling processing. The card reader controller 303 issues a similar initialization request to a class driver 305 (306). The class driver 305 (306) controls communication between the IC card R/W 103 and an IC card.

The supervisor 302, upon receiving the result of the initialization from the card reader controller 303, determines the reception port. At this time, if the supervisor 302 determines that the port that has received the result is a port A, the supervisor 302 determines that the authentication service is the authentication service A, and starts polling processing.

Figure 4A:
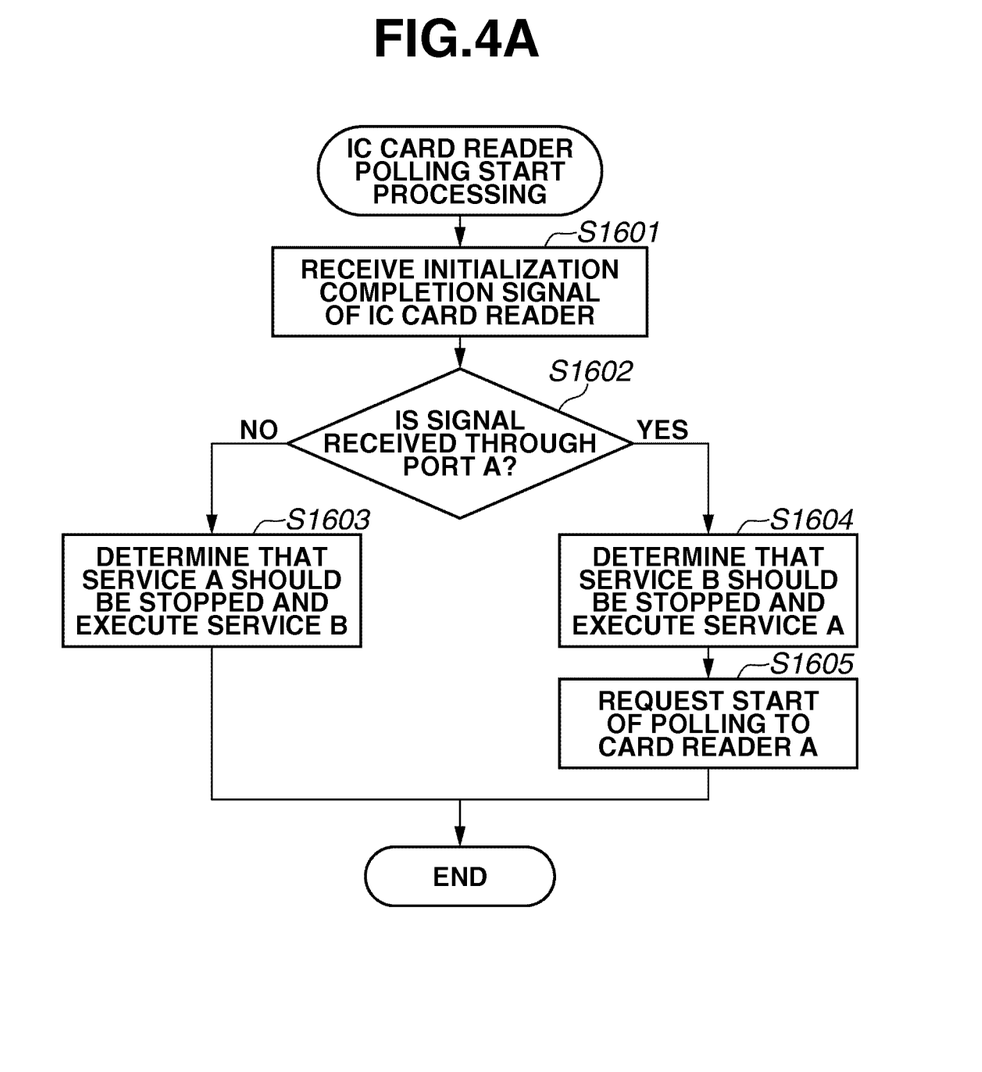
FIGS. 4A and 4B are flowcharts illustrating communication processing of the image forming apparatus.
Figure 4B:
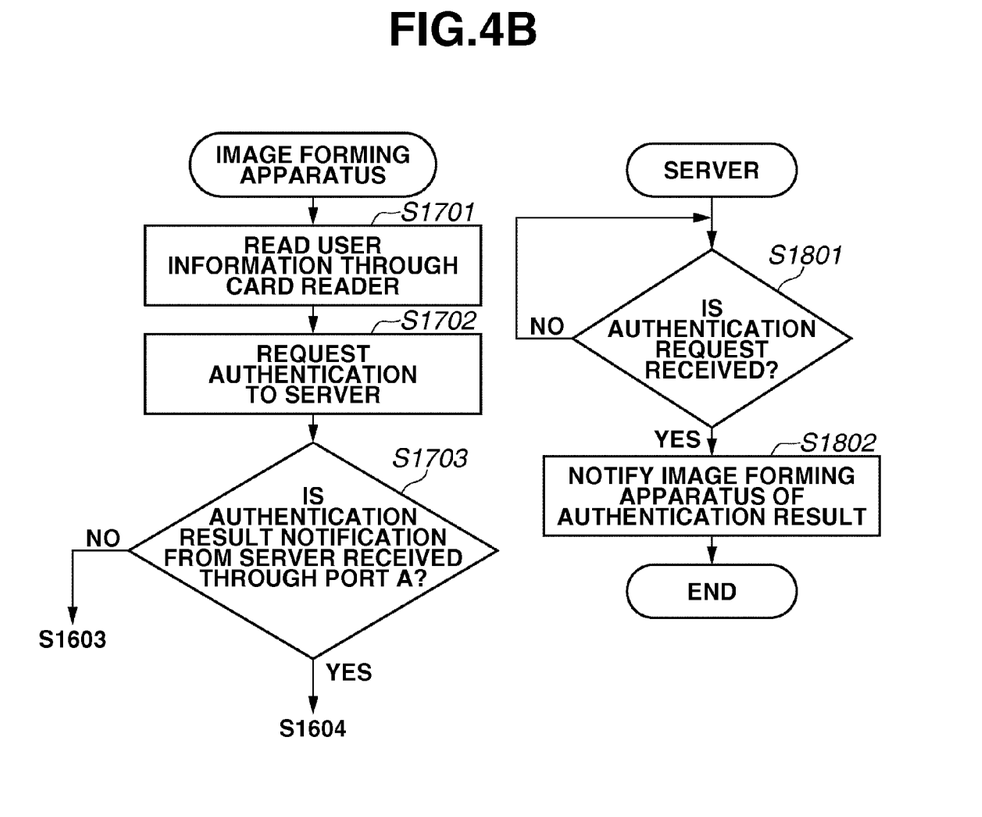

FIGS. 4A and 4B are flowcharts illustrating the communication processing of the image forming apparatus 101 according to the present exemplary embodiment. Especially, the example illustrated in FIG. 4A is an example of the polling processing performed by the supervisor 302. The CPU 201 illustrated in FIG. 2 loads a control program stored in the ROM 213 or the HDD 204 onto the RAM 212 and executes it, thereby realizing the steps S1601 to S1605. In the following description, the control entity is the supervisor 302 executed by the CPU 201.

First, after the supervisor 302 issues an initialization request, in step S1601, the supervisor 203 receives an initialization completion signal of the IC card R/W from the card reader controller 303. Then, the operation proceeds to step S1602. In step S1602, the supervisor 302 determines whether or not the port that has received the initialization completion signal is the port A. At this time, if the supervisor 302 determines that the port that has received the initialization completion signal is the port A (YES in step S1602), the operation proceeds to step S1604. If the supervisor 302 determines that the port that has received the initialization completion signal is not the port A but, for example, a port B (NO in step S1602), then the operation proceeds to step S1603.

Then, in step S1603, the supervisor 203 performs the processing for the service B including a user restriction function corresponding to the port B, and then ends the current polling start processing. Here, the processing for the service B is processing realized by an application stored in the HDD 204 of the image forming apparatus 101. More specifically, the service B includes service processing which does not read an IC card when a user logs off the service B after using, for example, a document management function.

While the supervisor 302 is performing the processing for the service B, the supervisor 302 stops the polling processing to the card reader A. Therefore, the service B ignores information from the card reader even when an IC card is placed on the card reader.

In the present exemplary embodiment, an application associated with a user restriction function is exemplified by the processing of a document management application having the login and logoff function with use of an IC card, but may be embodied by another functional processing.

On the other hand, in step S1604, the supervisor 302 performs the processing for the service A associated with a user restriction function corresponding to the port A. Here, the processing for the service A includes, for example, the processing which reads an IC card of a user at both times of logging in and logging off the service A.

As will be described later, during an execution of the processing of the service A, the supervisor 302 repeats the polling processing to the card reader A. Therefore, when an IC card is placed on the card reader, information is read through the card reader. Subsequently, in the service A, the processing requiring authentication is performed.

When the operation proceeds to step S1603 (NO in step S1602), it is possible to stop the service A that is not an execution target. When the processing proceeds to step S1604 (YES in step S1604), it is possible to stop the service B that is not an execution target. These processes are controlled by an instruction from the supervisor 302.

Further, turning-on/off of an interrupt login mode can be specified through, for example, the operation unit 211 of the image forming apparatus 101. This interrupt login mode will now be described. Even if it is determined, based on the identified port, that the authentication service by the application should be stopped (communication through the port B is detected), it is possible to instruct the service B not to stop the authentication service related to the service B.

In other words, the interrupt login mode can be tuned on. More specifically, for example, it is assumed that the application is started up under authentication of a user after the IC card is authenticated.

In this state, this user may leave, and another user may hold his/her ID card over the IC card unit to be authenticated for logging in the service B (interrupt login mode). In this case, if it is detected that the another user holds his/her IC card over the IC card unit, the polling processing to the IC card reader is not stopped.

Next, in step S1605, the supervisor 302 requests a start of polling to the card reader A, and ends the current polling start processing. According to this processing, it is possible to build a system capable of switching between the service processing based on the user restriction function A and the service processing based on the user restriction function B by identifying a port of an initialization result signal received from an IC card R/W.

Now, as an example of the service processing, if the IC card A can be handled by the IC card R/W 103A, the image forming apparatus 101 executes the authorization service which performs the IC card reading processing at the times of user's logging in and logging off.

On the other hand, if the IC card B can be handled by the IC card R/W 103B, the image forming apparatus 101 executes the authentication service which performs the IC card reading processing only when a user logs in the image forming apparatus 101.

In other words, even if the image forming apparatus 101 is an inexpensive apparatus, the information forming apparatus 101 controls an execution or a stop of an installed application by identifying a port of an initialization result signal notified at the time of initialization processing of a connected IC card R/W. As a result, it is possible to control an execution or a stop of an application corresponding to a service carrying out a user restriction function according to a user restriction specification for each country or a usage environment.

In the first exemplary embodiment, an application to be executed is determined by receiving an initialization result signal through the port corresponding to the device ID of an IC card reader connected to the image forming apparatus 101. Instead of this configuration, the image forming apparatus 101 may be configured to identify a port used for communication to an authentication server connected in the network, and then execute an application corresponding to the identified port. In the following, such an exemplary embodiment will be described.

The system configuration in the present exemplary embodiment corresponds to the system illustrated in FIG. 1B, and is a system including the authentication servers 105 and 106 connected in the network. Here, the authentication servers 105 and 106 perform difference authentication services.

Figure 5A:
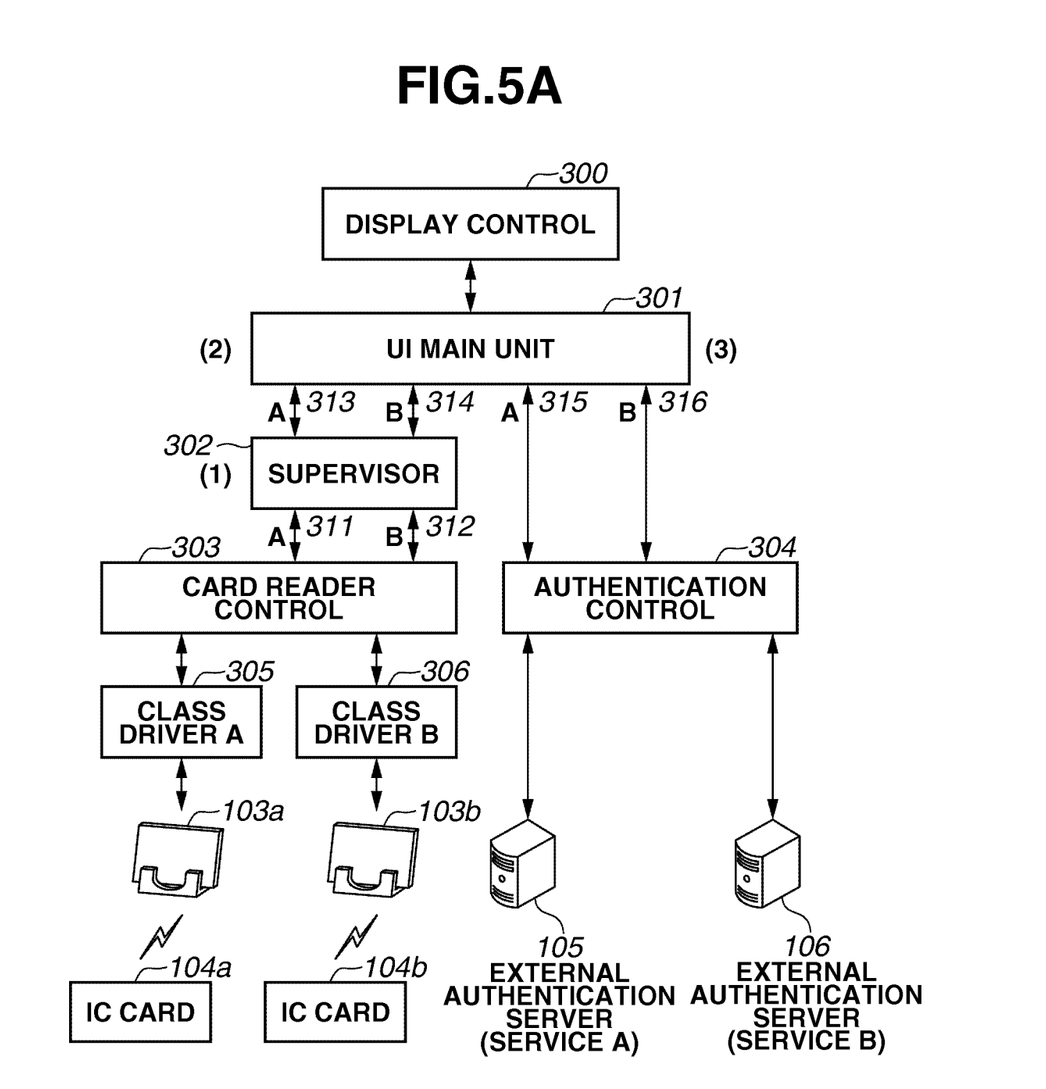
FIGS. 5A and 5B each illustrate a configuration of software modules of the image forming apparatus.
Figure 5B:
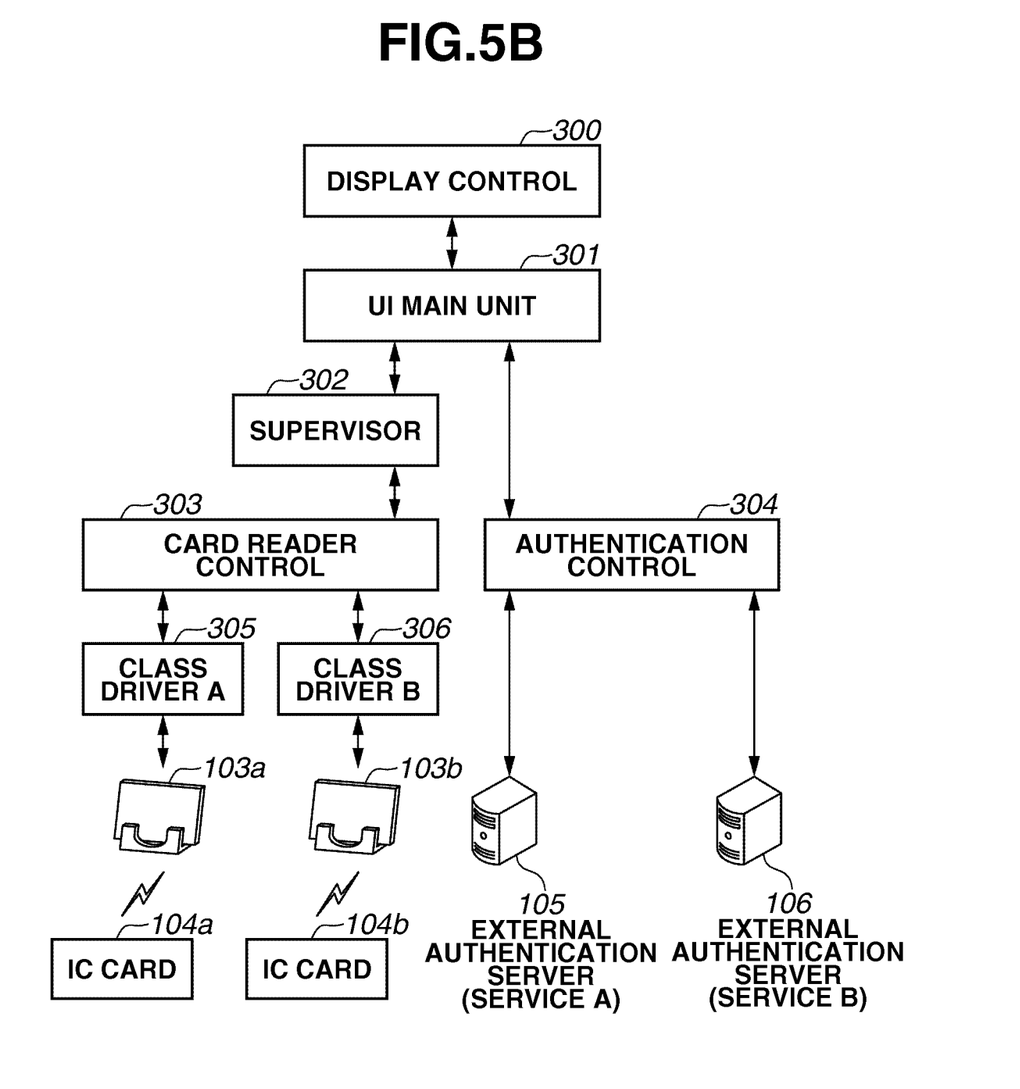

FIGS. 5A and 5B illustrate software modules and the signal exchanges among the respective modules in the image forming apparatus 101 according to the present exemplary embodiment. This example is an example of the system in which the authentication servers 105 and 106 perform user authentication.

In particular, FIG. 5A illustrates an example identifying which port has been used to receive an authentication result signal notified from the authentication server 105 or 106, executing any of registered applications, and performing the service processing associated with the application.

The image forming apparatus 101 includes the modules corresponding to the following units 300 to 306. A display controller 300 communicates with a user interface (UI) main unit 301. The UI main unit 301 communicates with the supervisor 302 and an authentication controller 304. The card reader controller 303 communicates with the class driver 305 or 306. Here, the class driver 305 is associated with the IC card R/W 103a, and the class driver 306 is associated with the IC card R/W 103b.

In the present exemplary embodiment, if the supervisor 302 receives an initialization result signal of the IC card R/W acquired via the card reader controller 303 through the reception port A, the supervisor 302 determines that the required service is the service A, and then requests a polling start. Similarly, if a signal indicating falling-out of an IC card is acquired through the supervisor 302, the image forming apparatus 101 determines that the required service is the service A and performs a control such that an error is not displayed.

On the other hand, if the information of the authentication result acquired from the authentication controller 304 is acquired through the port B in this state, it is determined that the required service is the service A, and the UI main unit 301 requests a stop to the authentication server 106.

FIG. 5B illustrates an example of service processing in which the currently used function is determined at the time of determination of which port has been used to receive an authentication result signal notified from the authentication server 105 or 106, and the image forming apparatus 101 executes or stops a registered application.

Figure 6:
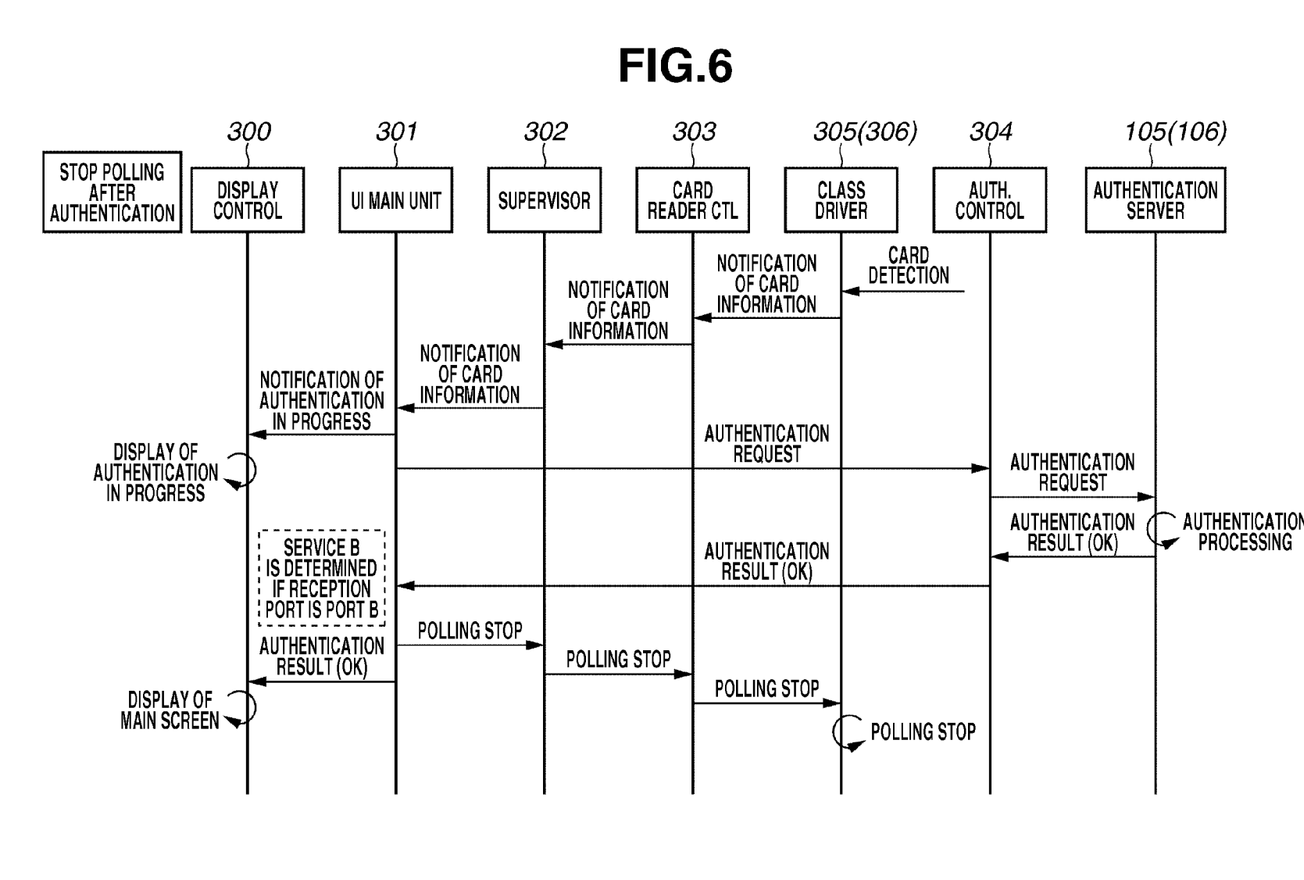
FIG. 6 is a sequence chart illustrating processing of the software modules of the image forming apparatus.

FIG. 6 is a sequence chart illustrating the software modules and the signal exchanges among the respective modules in the image forming apparatus 101 according to the present exemplary embodiment. In this example, the authentication server connected to the network is in charge of user authentication, instead of the image forming apparatus 101.

In the system illustrated in FIG. 6, the authentication controller 304 communicates with the authentication server 105 or 106, and obtains card information (a set of an ID and a password) read from an IC card that a user holds over the IC card R/W. Then, the authentication controller 304 requests authentication of the card information to the authentication server 105 or 106, and receives the authentication result from the authentication server 105 or 106.

At this time, since the communication is performed through the port specific to the authentication server 105 or 106, the UI main unit 301 of the image forming apparatus 101 can determine which port has received the authentication result. Then, the UI main unit 301 executes an application corresponding to the determined port, and performs the processing for the specific service.

If it is determined that the port specified by the UI main unit 301 is the port B, the UI main unit 301 notifies the supervisor 302 of a stop of the polling, similarly to the first exemplary embodiment. In response to this notification, the supervisor 302 notifies the card reader controller 303 of the stop of the polling. Then, the card reader controller 303 controls the class driver 305 (306) to stop the polling.

Now, the communication processing according to the present exemplary embodiment will be described with reference to the flowcharts illustrated in FIG. 4B. The CPU 201 illustrated in FIG. 2 loads a control program stored in the ROM 213 or HDD 204 onto the RAM 212 and executes it, thereby realizing steps S1701 to S1703. In the following description, the control entity is the supervisor 302 and the main unit 301 executed by the CPU 201.

Further, steps S1801 and S1802 are steps performed by the authentication server 105 or 106, in particular, are steps performed by the CPU of the authentication server 105 or 106.

First, in step S1701, the image forming apparatus 101 causes information of an IC card to be read through a connected IC card R/W, and receives the read IC card information. Then, in step S1702, the UI main unit 301 requests authentication of the received card information to the authentication server 105 or 106 through the authentication controller 304.

Upon the issue of this request, the operation proceeds to step S1801. If, for example, the authentication server 105 receives the card information (YES in step S1801), the operation proceeds to step S1802 where the CPU of the authentication server 105 refers to a user information table registered in advance, authenticates the card information, and then notifies the image forming apparatus 101 of the authentication result through the network.

Next, in step S1703, the UI main unit 301 of the image forming apparatus 101 determines whether or not the authentication result from the authentication server 105 has been received through the port A. At this time, if the UI main unit 301 determines that the authentication result from the authentication server 105 has been received through the port A (YES in step S1703), the operation goes to step S1604, and performs the subsequent steps.

On the other hand, in step S1703, if the UI main unit 301 determines that the authentication result from the authentication server 105 has been received through the port B (NO in step S1703), then the operation goes to step S1603, and performs the subsequent steps.

As illustrated in FIG. 5B, the image forming apparatus 101 may perform a control in such a manner that the function used by the image forming apparatus 101 is determined and the CPU 201 of the image forming apparatus 101 executes an application corresponding to the determined function.

Further, in the present exemplary embodiment, an application performed according to an identified port is exemplified by the application related to the user restriction function, but may be embodied by an application corresponding to a service related to another functional processing.

Further, in the above-described exemplary embodiment, the authentication server externally connected to the image forming apparatus 101 is in charge of authentication processing, but instead, the image forming apparatus 101 may store an authentication table, and perform authentication processing within the image forming apparatus 101. Further, in the present exemplary embodiment, the IC card R/W is connected through a USB, but may be connected through another interface other than a USB.

According to the above-described exemplary embodiments, in an image forming apparatus such as a copying machine offering a plurality of IC card authorization functions/services, it is possible to provide an appropriate apparatus control according to the respective functions/services.

More specifically, even with an apparatus that is not designed as an open platform, it is possible to provide a high value-added apparatus that can flexibly satisfy customer's needs.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-228315 filed Sep. 30, 2009, which is hereby incorporated by reference herein in its entirety.

What is claimed is:

1. An apparatus to which a card unit configured to communicate with a card storing user information is connectable, the apparatus, configured to identify an identified port by reading an initialization signal corresponding to an ID assigned to the card unit, comprising:
    a hardware storage unit configured to store an application for executing an authentication service;
    a hardware determination unit configured to determine the identified port from information acquired from the card unit;
    and
    a hardware control unit configured to control an execution or a stop of the authentication service according to the identified port, the hardware control unit further comprising a hardware supervisor unit configured to instruct the hardware control unit not to stop the authentication service even if it is determined that the authentication service should be stopped based on the identified port,
    wherein the hardware control unit controls not to stop the authentication service when an interrupt login mode is on.

2. The apparatus according to claim 1, wherein the hardware storage unit stores a plurality of applications associated with specific authentication service processing.

3. The apparatus according to claim 2, wherein the application is an authentication service which processes a login with a use of the card.

4. An apparatus to which a card unit configured to communicate with a card storing user information is connectable, the apparatus, configured to identify an identified port by reading an initialization signal corresponding to an ID assigned to the card unit, comprising:
    a hardware storage unit configured to store an application for executing an authentication service;
    a hardware request unit configured to request a server apparatus to authenticate the user information;
    a hardware determination unit configured to determine the identified port which receives a result of the requested authentication requested from the server apparatus; and
    a hardware control unit configured to control an execution or a stop of the authentication service according to the identified port, the hardware control unit further comprising a hardware supervisor unit configured to instruct the hardware control unit not to stop the authentication service even if it is determined that the authentication service should be stopped based on the identified port,
    wherein the hardware control unit controls not to stop the authentication service when an interrupt login mode is on.

5. The apparatus according to claim 4, wherein the hardware storage unit stores a plurality of applications associated with specific authentication service processing.

6. The apparatus according to claim 5, wherein the application is an authentication service which processes a login with a use of the card.

7. A method for controlling an apparatus to which a card unit configured to communicate with a card storing user information is connectable, the method comprising:
    identifying an identified port by reading an initialization signal corresponding to an ID assigned to the card unit;
    determining the identified port from information acquired from the card unit; and
    controlling an execution or a stop of an authentication service by an application stored in a hardware storage unit for executing the authentication service according to the identified port, the controlling further comprising instructing a hardware control unit not to stop the authentication service even if it is determined that the authentication service should be stopped based on the identified port,
    wherein the controlling controls not to stop the authentication service when an interrupt login mode is on.

8. The method according to claim 7, further comprising storing a plurality of applications associated with specific authentication service processing.

9. The method according to claim 8, further comprising processing a login with a use of the card by an authentication service, the authentication service being the application.

10. A method for controlling an apparatus to which a card unit configured to communicate with a card storing user information is connectable, the method comprising:
    identifying an identified port by reading an initialization signal corresponding to an ID assigned to the card unit;
    requesting a server apparatus to authenticate user information;
    determining the identified port which receives a result of the requested authentication from the server apparatus; and
    controlling an execution or a stop of an authentication service by an application stored in a hardware storage unit for executing the authentication service according to the identified port, the controlling further comprising instructing a hardware control unit not to stop the authentication service even if it is determined that the authentication service should be stopped based on the identified port,
    wherein the controlling controls not to stop the authentication service when an interrupt login mode is on.

11. The method according to claim 10, further comprising storing a plurality of applications associated with specific authentication service processing.

12. The method according to claim 11, further comprising processing a login with a use of the card by an authentication service, the authentication service being the application.

13. A non-transitory computer-readable recording medium recording a program for causing a computer to execute a method for controlling an apparatus to which a card unit configured to communicate with a card storing user information is connectable, the method comprising:
    identifying an identified port by reading an initialization signal corresponding to an ID assigned to the card unit;
    determining the identified port from information acquired from the card unit; and
    controlling an execution or a stop of an authentication service by an application stored in a hardware storage unit for executing the authentication service according to the identified port, the controlling further comprising instructing a hardware control unit not to stop the authentication service even if it is determined that the authentication service should be stopped based on the identified port,
wherein the controlling controls not to stop the authentication service when an interrupt login mode is on.

14. The non-transitory computer-readable recording medium recording a program for causing a computer to execute a method for controlling an apparatus to which a card unit configured to communicate with a card storing user information is connectable, the method comprising:

identifying an identified port by reading an initialization signal corresponding to an ID assigned to the card unit;

requesting a server apparatus to authenticate user information;

determining the identified port which receives a result of the requested authentication from the server apparatus; and controlling an execution or a stop of an authentication service by an application stored in a hardware storage unit for executing the authentication service according to the identified port, the controlling further comprising instructing a hardware control unit not to stop the authentication service even if it is determined that the authentication service should be stopped based on the identified port, wherein the controlling controls not to stop the authentication service when an interrupt login mode is on; and storing a plurality of applications associated with specific authentication service processing.

15. A non-transitory computer-readable recording medium recording a program for causing a computer to execute a method for controlling the apparatus to which a card unit configured to communicate with a card storing user information is connectable, the method comprising:

identifying an identified port by reading an initialization signal corresponding to an ID assigned to the card unit;

requesting a server apparatus to authenticate user information;

determining the identified port which receives a result of the requested authentication from the server apparatus; and controlling an execution or a stop of an authentication service by an application stored in a hardware storage unit for executing the authentication service according to the identified port, the controlling further comprising instructing a hardware control unit not to stop the authentication service even if it is determined that the authentication service should be stopped based on the identified port, wherein the controlling controls not to stop the authentication service when an interrupt login mode is on.

* * * * *